United States Patent
Tang et al.

(10) Patent No.: US 10,531,093 B2
(45) Date of Patent: Jan. 7, 2020

(54) METHOD AND SYSTEM FOR VIDEO FRAME INTERPOLATION BASED ON OPTICAL FLOW METHOD

(71) Applicant: Peking University Shenzhen Graduate School, Shenzhen (CN)

(72) Inventors: Chuanxin Tang, Shenzhen (CN); Ronggang Wang, Shenzhen (CN); Zhenyu Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 255 days.

(21) Appl. No.: 15/574,954

(22) PCT Filed: May 25, 2015

(86) PCT No.: PCT/CN2015/079697
§ 371 (c)(1),
(2) Date: Nov. 17, 2017

(87) PCT Pub. No.: WO2016/187776
PCT Pub. Date: Dec. 1, 2016

(65) Prior Publication Data
US 2018/0176574 A1 Jun. 21, 2018

(51) Int. Cl.
*H04N 19/139* (2014.01)
*G06T 3/40* (2006.01)
(Continued)

(52) U.S. Cl.
CPC ......... *H04N 19/139* (2014.11); *G06T 3/4023* (2013.01); *H04N 7/014* (2013.01);
(Continued)

(58) Field of Classification Search
None
See application file for complete search history.

(56) References Cited

U.S. PATENT DOCUMENTS

2009/0052532 A1* 2/2009 Robinson .............. G06T 3/4007
375/240.13

* cited by examiner

*Primary Examiner* — Lindsay J Uhl
(74) *Attorney, Agent, or Firm* — SV Patent Service

(57) ABSTRACT

A method and system for video frame interpolation based on an optical flow method is disclosed. The process includes calculating bidirectional motion vectors between two adjacent frames in a frame sequence of input video by using the optical flow method, judging reliabilities of the bidirectional motion vectors between the two adjacent frames, and processing a jagged problem and a noise problem in the optical flow method; marking "shielding" and "exposure" regions in the two adjacent frames, and updating an unreliable motion vector; with regard to the two adjacent frames, according to marking information about the "shielding" and "exposure" regions and the bidirectional motion vector field, mapping front and back frames to an interpolated frame to obtain a forward interpolated frame and a backward interpolated frame; synthesizing the forward interpolated frame and the backward interpolated frame into the interpolated frame; repairing a hole point in the interpolated frame to obtain a final interpolated frame. Since the optical flow method is based on pixels, disclosed method and system are more accurate and do not have blocking effect and other problems.

12 Claims, 5 Drawing Sheets

(51) Int. Cl.
*H04N 7/01* (2006.01)
*H04N 19/537* (2014.01)
*H04N 19/553* (2014.01)
*H04N 19/513* (2014.01)
*H04N 19/117* (2014.01)
*H04N 19/33* (2014.01)
*H04N 19/543* (2014.01)
*H04N 19/577* (2014.01)
*H04N 5/14* (2006.01)

(52) U.S. Cl.
CPC ......... *H04N 7/0127* (2013.01); *H04N 19/117* (2014.11); *H04N 19/33* (2014.11); *H04N 19/521* (2014.11); *H04N 19/537* (2014.11); *H04N 19/543* (2014.11); *H04N 19/553* (2014.11); *H04N 19/577* (2014.11); *H04N 5/145* (2013.01); *H04N 19/513* (2014.11)

METHOD AND SYSTEM FOR VIDEO FRAME INTERPOLATION BASED ON OPTICAL FLOW METHOD

TECHNICAL FIELD

The present invention relates to the field of video processing and transmission, and in particular, to a method and a system for video frame interpolation based on an optical flow method.

BACKGROUND OF THE INVENTION

With the development of HDTV and high-end multimedia information system, existing video signal program sources can no longer meet people's needs for visual effect; thus it is necessary to improve the frame rate of existing video program sources to achieve better visual effect. Meanwhile, although high compression ratios have been obtained in current video transmission encoding and decoding technologies, to adapt to some applications with limited bandwidth, the space-time resolution of video signals is usually decreased to reduce data further. Such data reduction can be achieved by frame skip at the encoding end in the time domain. Thus, video with low frame rate at the decoding end inevitably leads to discontinuous motion and degradation of image quality, especially in scenes comprising fast movements and complex details. To address this issue, video frame interpolation, that is, Frame Rate Up-Conversion (FRUC) technology can be used at the decoding end to restore the original frame rate, to improve the visual effect of images. Moreover, this technology can also be used for conversion between video formats with different frame rate. By inserting intermediate frames between adjacent frames, the low frame rate of video is raised to high frame rate to achieve the conversion between different frame rates.

The current mainstream frame rate up-conversion method is based on motion compensation interpolation using block matching. However, the block-matching algorithm includes an essential flaw: at the edge of the object, the regions that do not belong to the same object are assigned into a same block and given a same motion vector, which will cause the blocking effect of the interpolated frame. Moreover, the "conflict" and "hole" problems caused by "shielding" and "exposure" cannot be resolved using the existing methods.

Effectively reducing the blocking effect problem and solving the "shielding" and "exposure" problems have always been the focus of research in this field.

SUMMARY OF THE INVENTION

A video frame interpolation method based on an optical flow method can include the following steps:

A motion vector calculation process comprising: receiving a frame sequence of input video; and using optical flow method to calculate motion vectors between two adjacent frames, wherein the two adjacent frames include a forward reference frame and a backward reference frame; and Mapping an interpolated frame, comprising: mapping between the two adjacent frames to obtain an interpolated frame according to a motion vector field comprising the motion vectors between the two adjacent frames.

The video frame interpolation method based on an optical flow method can also include:

A motion vector calculation process including: calculating bidirectional motion vectors between the two adjacent frames using the optical flow method using the optical flow method with regard to a frame sequence of input video;

A reliability judging process, after the motion vector calculation process, including: judging reliability of the bidirectional motion vectors between the two adjacent frames to produce a reliability judgment result, marking an occlusion region in the two adjacent frames according to the reliability judgment result, and updating an unreliable motion vector in the occlusion region; and An interpolated frame mapping process including: according to marking information about the occlusion regions and a motion vector field obtained after update, mapping the forward reference frame to an interpolated frame to obtain a forward interpolated frame, mapping the backward reference frame to an interpolated frame to obtain a backward interpolated frame; and synthesizing the forward interpolated frame and the backward interpolated frame into the interpolated frame.

The method for judging reliability of the forward motion vector is similar to that for the backward motion vector. The determination of reliability of the forward motion vector is described below as an example of a method for judging motion vector reliability. The method includes assigning a pixel in the forward interpolated frame as a current pixel; defining a forward motion vector of the current pixel as a motion vector of the current pixel from the backward reference frame to the forward reference frame; and defining a forward reference pixel as a pixel in the forward reference frame that the forward motion vector of the current pixel directed to; defining a backward motion vector of the forward reference pixel as a motion vector of the forward reference pixel from the forward reference frame to the backward reference frame.

The method for judging reliability of the bidirectional motion vectors between the two adjacent frames to produce a reliability judgment result, in particular, can include: calculating a gray scale difference between the current pixel in the backward reference frame and the forward reference pixel in the forward reference frame; if the gray scale difference is equal to or greater than a threshold of the gray scale difference, determining that the forward motion vector of the current pixel is unreliable; if the gray scale difference is less than a threshold of the gray scale difference, calculating a distance between the forward motion vector of the current pixel and the backward motion vector of the forward reference pixel; if the distance between the forward motion vector of the current pixel and the backward motion vector of the forward reference pixel is less than a threshold of motion vector distance, determining that the forward motion vector of the current pixel is reliable; and if the distance between the forward motion vector of the current pixel and the backward motion vector of the forward reference pixel is more than or equal to a threshold of motion vector distance, determining that the forward motion vector of the current pixel is unreliable.

The step of updating an unreliable motion vector in the occlusion region can include replacing an unreliable motion vector of a pixel by an inverse value of a reliable motion vector in the bidirectional motion vector of the pixel.

The steps of mapping the forward reference frame to an interpolated frame to obtain a forward interpolated frame, and mapping the backward reference frame to an interpolated frame to obtain a backward interpolated frame can include:

judging reliability of the motion vector of a pixel in the forward reference frame or the backward reference frame;

if the motion vector of the pixel is reliable, further judging whether the pixel has a "conflict";

if the motion vector of the pixel is unreliable, judging whether the pixel is in "shielding" and/or "exposure" region; if YES, further judging whether the pixel has a "conflict"; and if NO, discarding the pixel;

if the pixel has no "conflict", mapping the pixel; and if the pixel has a "conflict", judging whether the motion vector of the pixel is more reliable than the pixel that has "conflict" and been mapped; if YES, mapping the pixel; and if NO, discarding the pixel.

The reliability judging process can also include processing a jagged problem and/or a noise problem in the optical flow method, which includes performing a smoothing filtering of the bidirectional motion vector between the two adjacent frames based on image segmentation.

The interpolated frame repairing process after the interpolated frame mapping process: repairing a hole point in the interpolated frame to obtain the interpolated frame.

The reliability judging process can also include processing a jagged problem and/or a noise problem in the optical flow method, which can include: spatial up-sampling the two adjacent frames; or, performing a smoothing filtering of the bidirectional motion vector between the two adjacent frames based on image segmentation after spatial up-sampling; or, performing a smoothing filtering of the bidirectional motion vector between the two adjacent frames; and spatial up-sampling the two adjacent frames based on image segmentation after smoothing filtering. The interpolated frame repairing process can include repairing a hole point in the interpolated frame, and down-sampling of the interpolated frame after repairing the hole point to obtain the interpolated frame.

The step of spatial up-sampling the two adjacent frames can include multiplying number of pixels of each image in the two adjacent frames by a pre-set time; and enlarging the value of the bidirectional motion vector by the pre-set time. The step of down-sampling the interpolated frame can include reducing number of pixels of each image in the interpolated frame by a pre-set time; and reducing a value of the bidirectional motion vector by the pre-set time.

The process of repairing a hole point in the interpolated frame can include: analyzing motion vectors of non-hole pixels within a preset range adjacent to the hole pixel in the interpolated frame; obtaining a most proper one of motion vectors of the non-hole pixels; and mapping the motion vector of the hole pixel using the most proper motion vector so as to interpolate the hole region.

A video frame interpolation system based on an optical flow method can include a motion vector calculation unit and an interpolated frame mapping unit.

The motion vector calculation can calculate motion vectors, wherein the motion vector calculation unit can receive a frame sequence of input video and to use optical flow method to calculate motion vectors between two adjacent frames, wherein the two adjacent frames include a forward reference frame and a backward reference frame.

The motion vector calculation unit can performing a calculation to obtain the motion vector between two adjacent frames by using the optical flow method with regard to a frame sequence of input video. The system further comprises a reliability judging unit that can judge reliability of the bidirectional motion vectors between the two adjacent frames to produce a reliability judgment result, to mark an occlusion region in the two adjacent frames according to the reliability judgment result, and to update an unreliable motion vector in the occlusion region. An interpolated frame mapping unit can map the forward reference frame to an interpolated frame to obtain a forward interpolated frame, map the backward reference frame to an interpolated frame to obtain a backward interpolated frame; and synthesize the forward interpolated frame and the backward interpolated frame into the interpolated frame.

The motion vector calculation unit can further assign a pixel in the backward reference frame as a current pixel, define forward motion vector of the current pixel as a motion vector of the current pixel from the backward reference frame to the forward reference frame, and define a forward reference pixel as a pixel in the forward reference frame that the forward motion vector of the current pixel directed to, and define a backward motion vector of the forward reference pixel as a motion vector of the forward reference pixel from the forward reference frame to the backward reference frame.

The reliability judging unit can judge whether the bidirectional motion vector between the two adjacent frames is reliable, and can in particular calculate a gray scale difference between the current pixel in the backward reference frame and the forward reference pixel in the forward reference frame; if the gray scale difference is equal to or greater than a threshold of the gray scale difference, to determine that the forward motion vector of the current pixel is unreliable; if the gray scale difference is less than a threshold of the gray scale difference, to calculate a distance between the forward motion vector of the current pixel and the backward motion vector of the forward reference pixel; if the distance between the forward motion vector of the current pixel and the backward motion vector of the forward reference pixel is less than a threshold of motion vector distance, to determine that the forward motion vector of the current pixel is reliable; and if the distance between the forward motion vector of the current pixel and the backward motion vector of the forward reference pixel is more than or equal to a threshold of motion vector distance, to determine that the forward motion vector of the current pixel is unreliable.

The interpolated frame mapping unit can map the forward reference frame to an interpolated frame to obtain a forward interpolated frame, and map the backward reference frame to an interpolated frame to obtain a backward interpolated frame, and can include:

with regard to a pixel in the forward reference frame or the backward reference frame, judging whether the motion vector of the pixel is reliable;

if the motion vector of the pixel is reliable, further judging whether the pixel has a "conflict";

if the motion vector of the pixel is unreliable, judging whether the pixel is in "shielding" and/or "exposure" region; if YES, further judging whether the pixel has a "conflict"; and if NO, discarding the pixel;

if the result of judging whether the pixel has a "conflict" is NO, mapping the pixel;

if the result of judging whether the pixel has a "conflict" is YES, judging whether the motion vector of the pixel is more reliable than the pixel that has "conflict" and been mapped to it; if YES, mapping the pixel; and if NO, discarding the pixel.

The reliability judging process can include processing a jagged problem and/or a noise problem in the optical flow method, which can include: performing a smoothing filtering of the bidirectional motion vector between the said two adjacent frames based on image segmentation; spatial up-sampling the two adjacent frames; or, performing a smoothing filtering of the bidirectional motion vector between the two adjacent frames based on image segmentation after spatial up-sampling; performing a smoothing filtering of the bidirectional motion vector between the two adjacent frames; and to spatial up-sample of the two adjacent frames based on image segmentation after smoothing filtering. The system video frame interpolation system can further include an interpolated frame repairing unit that can repair a hole point in the interpolated frame and to down-sample the interpolated frame after repairing the hole to obtain the interpolated frame.

The reliability judging unit can spatial up-sampling of the two adjacent frames, and can multiply number of pixels of each image in the two adjacent frames by a pre-set time and to enlarge the value of the bidirectional motion vector by the pre-set time. The interpolated frame repairing unit can reduce number of pixels of each image in the interpolated frame by a pre-set time and to reduce a value of the bidirectional motion vector by the pre-set time.

The interpolated frame repairing unit can further analyze motion vectors of non-hole pixels within a preset range adjacent to the hole pixel in the interpolated frame, to obtain a most proper one of motion vectors of the non-hole pixels, and to map the motion vector of the hole pixel using the most proper motion vector so as to interpolate the hole region.

The existing frame rate up-conversion usually adopts motion compensation interpolation based on block matching, which is based on blocks, so there is blocking effect, inaccuracy and other problems. According to frame rate up-conversion in the present invention, a bidirectional motion vector between two adjacent frames is obtained through calculation by using the optical flow method. Since the optical flow method is based on a pixel, the solution of the conversion is more accurate, and there is no blocking effect or other problems.

DETAILED DESCRIPTION OF THE INVENTION

Optical flow is divided into two categories: sparse optical flow and dense optical flow. In the dense optical flow, each pixel in a frame has a motion vector. In sparse optical flow, only a portion of the pixels has motion vectors. In the present disclosure, a dense optical flow is preferably used in a video frame interpolation, so that each pixel has a motion vector. The use of dense optical flow to obtain pixel-based motion vectors for frame interpolation can solve the blocking effect problem of conventional technologies, and the motion vector estimated based on an optical flow method is more accurate.

Embodiment 1

Figure 1:
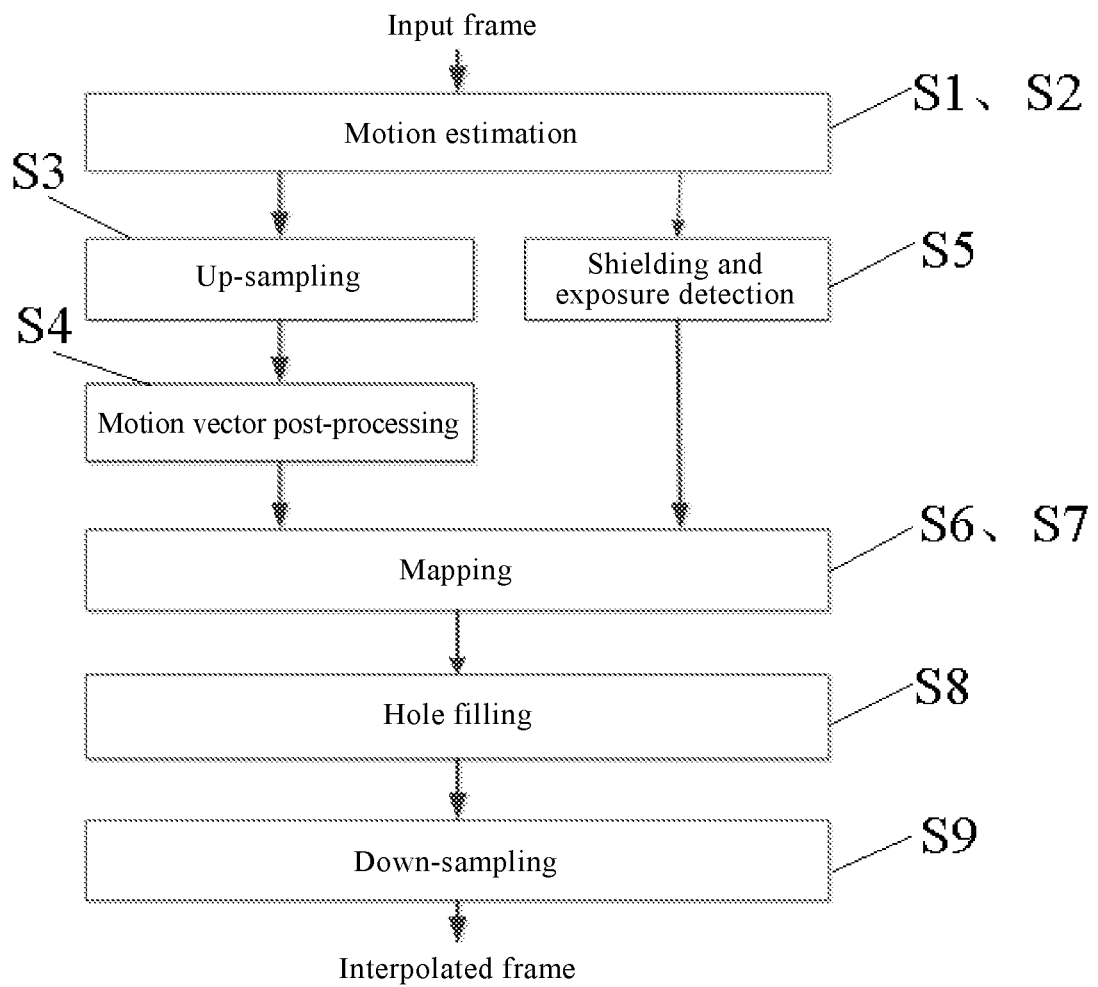
FIG. 1 is a flowchart for a video frame interpolation method based on the dense optical flow method according to an embodiment of the present invention.

Referring to FIG. 1, a video frame interpolation method based on dense optical flow can include the following steps:

Step S1: with regard to a frame sequence of input video, performing a calculation to obtain a bidirectional motion vector between two adjacent frames using the optical flow method.

For the convenience of description, take t−1 frame, t frame and t+1 frame in a frame sequence as an example. The t frame is the backward reference frame, and the t+1 frame is the forward reference frame. The t frame is the main viewing angle in the current example, wherein t is an integer greater than one. With regard to a pixel in the t frame, the motion vector directed to the t−1 frame is the backward motion vector of the pixel, and the motion vector directed to the t+1 frame is the forward motion vector of the pixel. In this way, many of the pixels have their corresponding bidirectional motion vectors. The motion vectors between the video frame sequences constitute the motion vector field. A bidirectional motion vector refers to a forward motion vector from the forward reference frame to the backward reference frame, and a backward motion vector from the backward reference frame to the forward reference frame.

Step S2: judging whether the bidirectional motion vector is reliable.

In the present implementation, the reliability of motion vector is judged using a gray scale Absolute Difference (AD) between the pixels of the forward and the backward reference frames (two adjacent frames) and the Motion Vector Distance (MVD).

Figure 2:
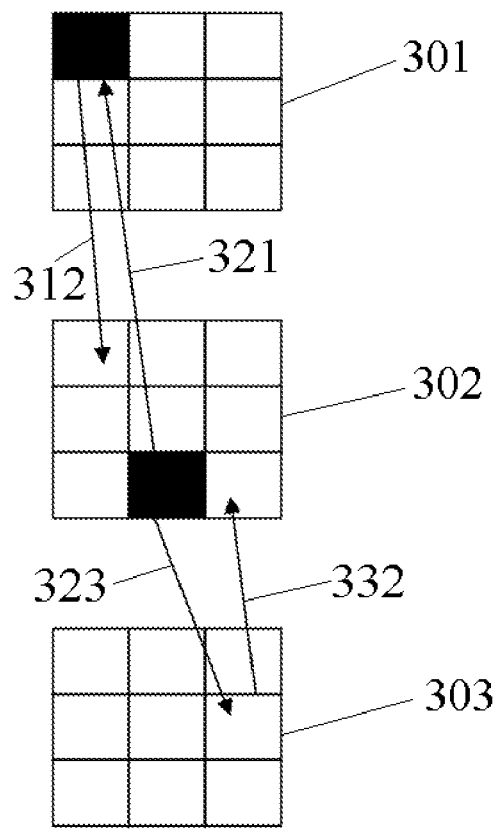
FIG. 2 is a schematic view of spatial up-sampling.

In particular, referring to FIG. 2, for example, a certain pixel of the t frame 302 (i.e. the backward reference frame 302) is the current pixel. The motion vector of the current pixel from the t frame 302 to the t+1 frame 303 is the forward motion vector 323 of the current pixel. The pixel in the t+1 frame 303 which the forward motion vector 323 is directed to is the forward reference pixel in the t+1 frame 303. The motion vector of the forward reference pixel from the t+1 frame 303 to the t frame 302 is the backward motion vector 332 of the forward reference pixel.

The motion vector of the current pixel from the t frame 302 to the t−1 frame 301 is the backward motion vector 321 of the current pixel. The pixel that the backward motion vector 321 is directed to in the t−1 frame 301 is the t−1 frame reference pixel. The motion vector of the t−1 frame reference pixel from the t−1 frame 301 to the t frame 302 is the forward motion vector 312 of the t−1 frame reference pixel.

With regard to the forward motion vector 323 of the current pixel, if the gray scale difference between the current pixel in the t frame 302 and the forward reference pixel in the t+1 frame 303 is less than the gray scale difference threshold Th_AD, and the distance between the forward motion vector 323 of the current pixel and the backward motion vector 332 of the forward reference pixel is less than the motion vector distance threshold Th_MVD, the forward motion vector 323 of the current pixel is reliable; otherwise, it is unreliable. In the present example, Th_AD is set as 20, and Th_MVD is set as 3.

The gray scale difference between the current pixel in the backward reference frame 302 and the forward reference pixel in the forward reference frame 303 is calculated as follows, $$AD_t(x)=|F_t(x)-F_{t+1}(x+V_x)|, \quad (1.1)$$

wherein $AD_t(x)$ is the gray scale difference between the current pixel and the forward reference pixel. $F_t(x)$ is the gray scale of current pixel in the backward reference frame 302. $F_{t+1}(x+V_x)$ is the gray scale of forward reference pixel in the forward reference frame 303. $V_x$ is the forward motion vector 323 from the current pixel from the backward reference frame 302 to the forward reference frame 303. x is the position of current pixel in the backward reference frame 302. $x+V_x$ is the position of the forward reference pixel in the forward reference frame. t is the sequence number of the backward reference frame 302, and t+1 is the sequence number of the forward reference frame 303.

The distance between the forward motion vector of the current pixel and the backward motion vector of the forward reference pixel is calculated as follows, $$MVD_t(x) = \|V_{t,x}^f - V_{t+1,x'}^b\|, \tag{1.2}$$

wherein $MVD_t(x)$ is the distance between the forward motion vector 323 of the current pixel and the backward motion vector 332 of the forward reference pixel. $V_{t,x}^f$ is the forward motion vector of the current pixel. $V_{t+1,x'}^b$ is the backward motion vector of the forward reference pixel. x is the position of current pixel in the backward reference frame 302. x' is the position of forward reference pixel in the forward reference frame 303. $\|\cdot\|$ represents a Euclidean distance.

The relationship between the forward frame and the backward frame is relative, which is determined by the order of the frames in the video sequence in the present disclosure.

The relationship between x and x' is as follows:

$$x + V_{t,x}^f = x', \tag{1.3}$$

The reliability of the backward motion vector 321 of the current pixel in the t frame 302 is judged by calculating the gray scale difference between the current pixel and the t−1 frame reference pixel, and the distance between the backward motion vector 321 of the current pixel and the forward motion vector 312 of the reference pixel in t−1 frame using the same method as described above.

Step S3: spatial up-sampling each frame in the frame sequence to double the size of the frame in both horizontal and vertical directions. The values of the motion vectors obtained in Step S1 are doubled.

Figure 3:
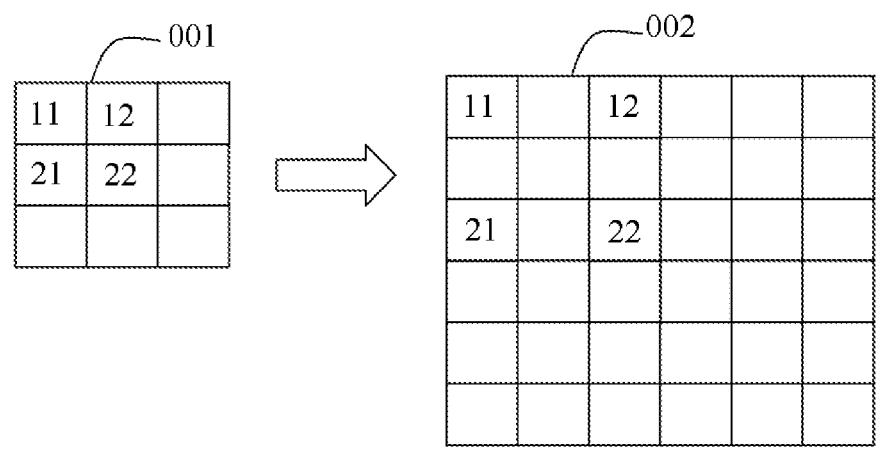
FIG. 3 is a schematic view of judging whether the motion vector is reliable according to another embodiment of the present invention.

Referring to FIG. 3, an exemplified frame 001 contains pixel 11, pixel 12, pixel 21, and pixel 22. Spatial up-sampling is performed on the frame to double the number of pixels in the frame, so that the size of the frame 002 obtained is doubled in horizontal and vertical directions, as shown in FIG. 3. In particular, a circle of pixels is added around each pixel in the frame 002 after spatial up-sampling. The pixel 22 in frame 001 is still the pixel 22 in frame 002, and 8 pixels are added around the pixel 22 in frame 002. With regard to pixel 11, pixel 12 and pixel 21 in frame 001, the same pixel is added under pixel 11 and above pixel 21, and the same pixel is added to the right of pixel 11 and the left of pixel 12. In this way, the pixels in frame 001 are doubled to obtain frame 002.

Before spatial up-sampling, the motion vectors between the frames are doubled in values. In the form of expression, the motion vectors are doubled in length, while their directions are unchanged.

It should be understood that those skilled in the art can also expand the size of the frame or increase the number of pixels by using other methods, and the expansion factor can be two or several times.

The reason for the spatial up-sampling of the video sequence and the motion vector field is that in the optical flow method the motion vector is calculated using floating point numbers. In the subsequent interpolation phase, these floating-point motion vectors need to be rounded into integers, which produce jaggedness in the synthetic interpolation frame. In order to eliminate the jaggedness generated by the interpolation of the floating point motion vector obtained directly by using the optical flow method, a Super Sampling Anti-Aliasing (SSAA) method is used in the present example, i.e., spatial up-sampling. In particular, the input video sequence and the motion vector field are up-sampled twice in the horizontal direction and in the vertical direction, respectively, and the motion vector is multiplied by two. In this way, the size of the subsequently synthesized interpolated frame is twice as large as the original image in both the horizontal and the vertical directions. When the result is output finally, it needs to be down-sampled twice in the horizontal direction and the vertical direction to return to the original size.

Step S4: performing a smoothing filtering based on image segmentation of the bidirectional motion vector between the two adjacent frames after spatial up-sampling.

The motion vector of the pixel obtained by the optical flow method may be "discrete". Thus, the motion vectors of pixels belonging to the same object can sometimes be inconsistent. In addition, due to changes in light, image noise, motion of non-rigid body and other factors, some isolated points may exist in the motion vector field, thus breaking continuities of the motion vectors. Interpolation using these discontinuous pixels of these motion vectors can produce noise points in the reconstructed interpolated frame. In order to maintain spatial continuity better, post-processing by using a smoothing filtering method based on image segmentation is performed on the motion vectors in the present implementation. After the image segmentation, the motion vectors of the pixels in the same region should be more consistent. Therefore, with respect to the motion vector of each pixel, a reliable motion vector of a neighboring pixel in the same region is used for smoothing of the motion vector of the pixel. The image segmentation is a known technique, and the specific formula is as follows:

$$V_c = \frac{1}{N} \sum_{j \in W} (V_j \in \alpha_j), \tag{1.4}$$

wherein W is the index of the pixel in the neighborhood of size 11*11 with the pixel with the current motion vector to be updated as the center (the center pixel), N is the number of neighborhood pixels with reliable motion vectors in the same segmentation region as the center pixel, j is the index of pixels in the neighborhood, and $\alpha_j$ is defined as follows:

$$\alpha_j = \begin{cases} 1 & \begin{array}{l}\text{pixel } j \text{ is in the same segmentation region as} \\ \text{the center pixel, and the motion vector of} \\ \text{pixel } j \text{ is reliable}\end{array} \\ 0 & \text{otherwise} \end{cases} \tag{1.5}$$

The purpose of smooth filtering of motion vectors based on image segmentation is to keep the motion vectors of the same object region consistent. Therefore, after image segmentation, smoothing is performed on the motion vectors in the region of the same object. Such motion vectors are used in frame interpolation to maintain spatial continuity, in order to solve the problem of blocking effect.

Step S5: marking "shielding" and "exposure" regions in the two adjacent frames, and updating an unreliable motion vector.

The "shielding" and "exposure" regions are problems that exist in the conventional technologies. Techniques of marking these regions already exist, which will not be described herein.

The "shielding" and "exposed" regions are also called occlusion regions. The occlusion region is defined follows: when one of the forward motion vector and the backward motion vector of a pixel is reliable and the other one is unreliable, it is determined that the unreliable motion vector belongs to the occlusion region.

An occlusion region detection method based on time domain is used in the present implementation to mark and update the motion vectors of the occlusion region. Only the occlusion region corresponding to the forward and backward frames in the interpolated frame is used for mapping, which avoids shadow phenomenon. The occlusion region detection method based on time domain in the present implementation is dependent on the reliability of the motion vector, and is described in detail below.

Figure 4:
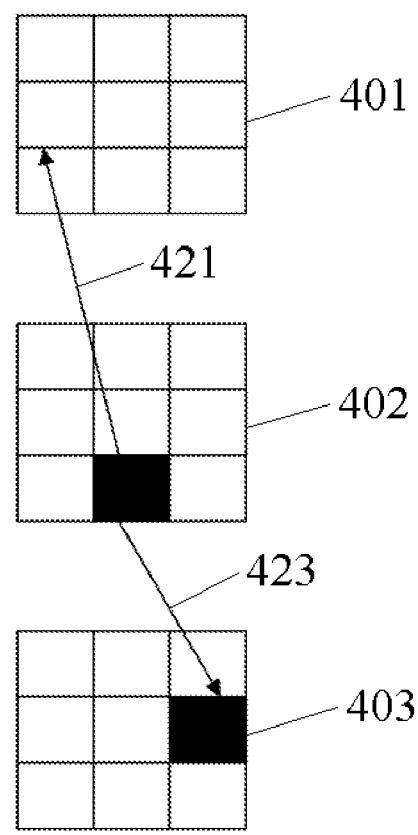
FIG. 4 is a schematic view of judging the reliability of the motion vector according to another embodiment of the present invention.

The premise of the occlusion region detection is that the movement of an object between two adjacent frames is continuous, and its motion velocity and its direction are consistent between the frames. Sometimes the object exists in the previous frame, but suddenly disappears due to motion in the current frame; or sometimes the object does not exist in the previous frame, yet, due to motion, suddenly appears in the current frame, these regions belong to occlusion regions. According to the premise, the motion of the object between frames is continuous. For the case that the motion of the object suddenly disappears in the current frame, referring to FIG. 2, the forward motion vector 323 of the object in the previous frame 302 is unreliable (because the object does not exist in the current frame 303), yet the backward motion vector 321 of the object in the previous frame 302 is reliable (because the object is present in the previous frame 301). FIG. 3 only illustrates a portion of the pixels, wherein each small square represents a pixel. A black square represents a pixel contained in an object, or a whole object. Similarly, in the case when the motion of object suddenly appears in the current frame, referring to FIG. 4, the backward motion vector 421 of the object in the current frame 402 is unreliable (because the object did not appear in the previous frame 401), yet the forward motion vector 423 of the object in the current frame 402 is reliable (because the object will continue to appear in the next frame 403).

According to the above analysis, it can be seen that for the object belonging to the occlusion region, only the motion vector in one direction is reliable and the motion vector in the other direction is unreliable. Therefore, the occlusion region detection method in the present implementation is as follows. As the motion vector of a pixel in a frame is reliable only in one direction, mark the motion vector in the other direction, indicating that the object belongs to the occlusion region in the direction of unreliable motion vector. Meanwhile, according to the assumption that the motion velocity and direction of the object are substantially the same between frames, the motion vector in the unreliable direction is updated by using the motion vector in the reliable direction, that is, the motion vector in the unreliable direction is replaced by the motion vector in reverse direction of the motion vector in the reliable direction.

Figure 5:
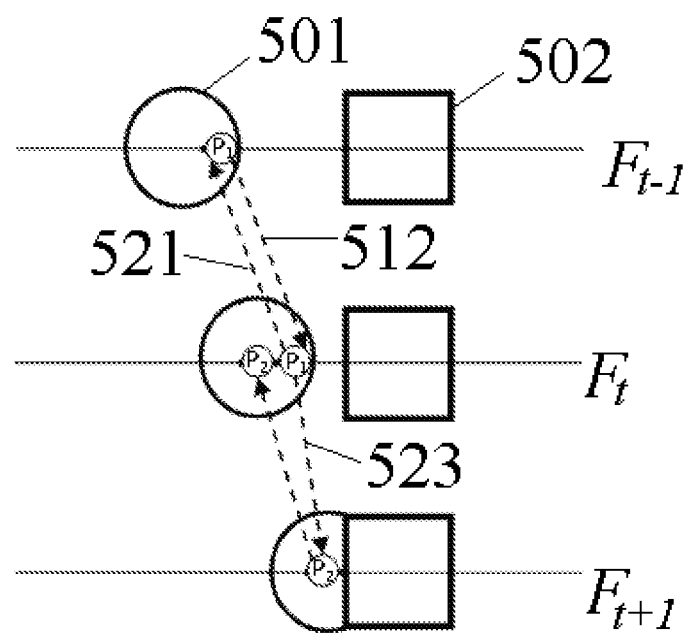
FIG. 5 is a schematic view of judging whether the motion vector between the three adjacent frames is reliable according to one embodiment of the present invention.

For example, FIG. 5 illustrates images in three adjacent frames, wherein the circle 501 and the block 502 represent two objects whose motion speed and direction are substantially consistent in the three adjacent frames. The pixel P1 in the t−1 frame ($F_{t-1}$) moved to the t frame ($F_t$), so pixel P1 was not in the occlusion region in the process, and the motion vector 512 of pixel P1 from the t−1 frame to the t frame is reliable. From the view from the t frame to the t−1 frame, the motion vector 521 of pixel P1 is also reliable. The motion vector 512 and the motion vector 521 are equal in size and in the opposite direction. As pixel P1 moved from the t frame to the t+1 frame ($F_{t+1}$), since the pixel P1 is shielded by the block, pixel P1 belongs to the occlusion region in the process. Therefore, it is determined that the motion vector 523 of pixel P1 in the t frame and the t+1 frame is unreliable. The pixel P1 in the t frame is pointed to pixel P2 in the t+1 frame by mistake. Therefore, with respect to pixel P1 in the t frame, the backward motion vector 521 is reliable and the forward motion vector 523 is unreliable. The region in the direction of the forward motion vector 523 of pixel P1 in the t frame is marked as the occlusion region, and the forward motion vector 523 of pixel P1 is updated by the reversed value of backward motion vector 521 of pixel P1 in the t frame.

Step S6: with regard to the two adjacent frames, a bidirectional motion vector field obtained according to the marking information about the "shielding" and "exposure" regions and after update processing, the t frame is mapped to an interpolated frame to obtain a forward interpolated frame, and the t+1 frame is mapped to an interpolated frame to obtain a backward interpolated frame.

Taking the t frame and the t+1 frame as an example, the t frame is mapped to an interpolated frame to obtain a forward interpolated frame, and the t+1 frame is mapped to an interpolated frame to obtain a backward interpolated frame.

Figure 6:
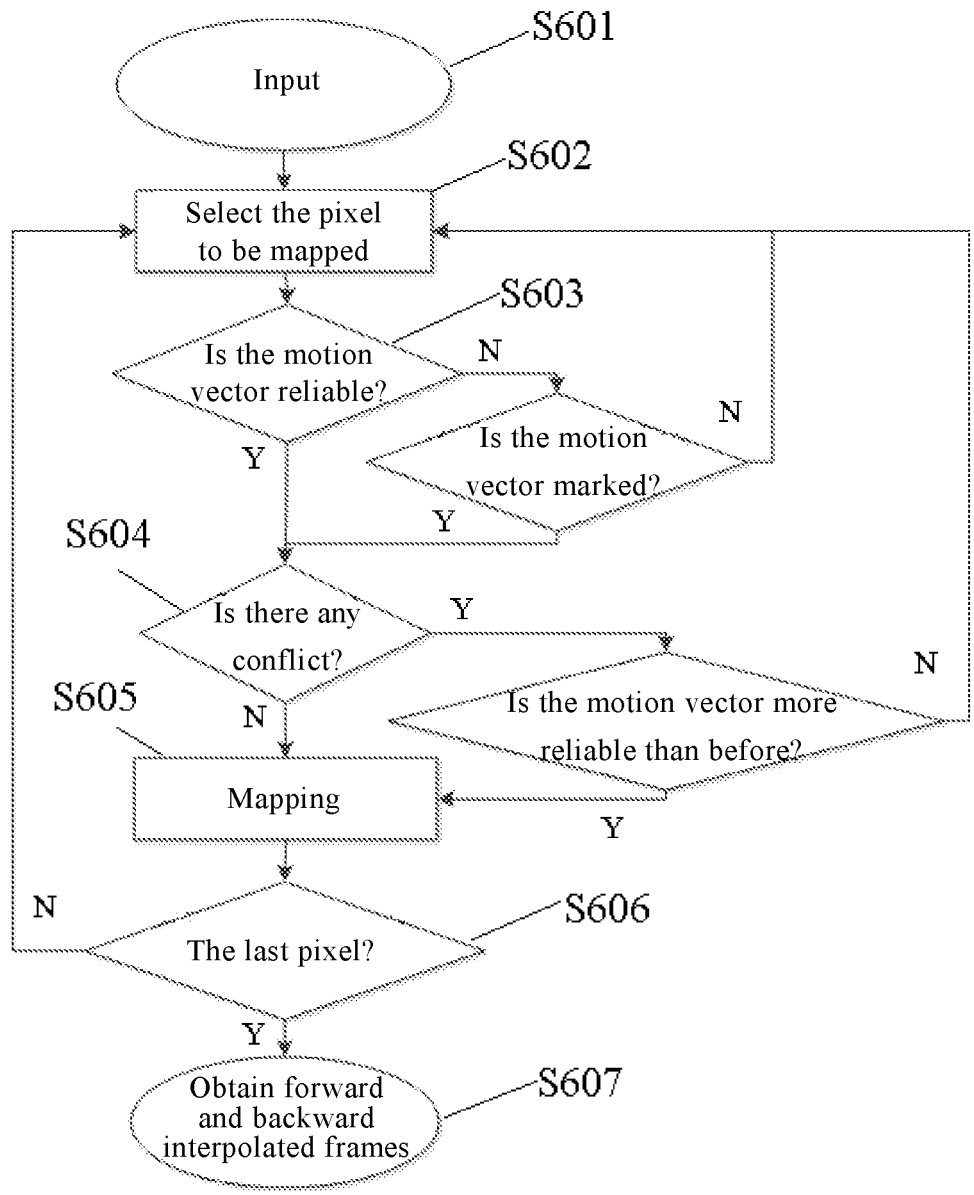
FIG. 6 is a flowchart of mapping the reference frames to an interpolated frame to obtain a forward interpolated frame and a backward interpolated frame.

Referring to FIG. 6, the steps for mapping the t frame to an interpolated frame to obtain a forward interpolated frame includes the following (the same for mapping the t+1 frame to an interpolated frame to obtain a backward interpolated frame):

Step S601: inputting the current frame and the motion vector.

Step S602: selecting the pixels for mapping.

Step S603: judging whether the motion vector of the pixel is reliable.

If the motion vector of the pixel is reliable, go to Step S604 to determine whether the pixel has a "conflict";

if the motion vector of the pixel is unreliable, determine whether the pixel is in "shielding" and/or "exposure" region, that is, whether the pixel is marked; if YES, go to Step S604 to judge whether the pixel has a "conflict"; and if NO, discard the pixel;

if the result of judging whether the pixel has a "conflict" is NO in Step S604, go to Step S605 to map the pixel;

if the result of judging whether the pixel has a "conflict" is YES in Step S604, determine whether the motion vector of the pixel is more reliable than the pixel that has "conflict" and been mapped to it ("conflict" indicates that other pixels are mapped at the location of the pixel before); if YES, go to Step S605 to map the pixel; and if NO, discard the pixel.

After the pixel is mapped in Step S605, determine whether the pixel is the last pixel to be mapped in Step S606, and if YES, go to Step S7; and if NO, continue Step S602 to select another pixel that has not been mapped.

Step S607: after all the pixels in a frame have been mapped, generating the forward interpolated frame of the t frame; mapping the t+1 frame to an interpolated frame to obtain the backward interpolated frame of the t+1 frame with the above steps. Mapping the t frame to an interpolated frame to obtain a forward interpolated frame and mapping the t+1 frame to an interpolated frame to obtain a backward interpolated frame can also be completed with the above steps simultaneously.

Step S7: synthesizing the forward interpolated frame of the t frame and the backward interpolated frame of the t+1 frame into the interpolated frame.

In this way, an interpolated frame will be added between the two frames in the original frame sequence. The method combining two frames into one frame can adopt the existing techniques, which will not be described here.

Step S8: repairing a hole point in the interpolated frame using the difference algorithm.

It consists of two processes: first, using motion vectors of adjacent non-hole point for interpolating the hole region; and then using the linear interpolation method to treat the remaining hole points.

In the process of "using the motion vectors of adjacent non-hole point for interpolating the hole region", in particular, each non-hole in the interpolated frame corresponds to a forward motion vector, or a backward motion vector, or bidirectional motion vector. For pixel P of a hole point in the interpolated frame, find the nearest non-hole pixels above, below, on the left or the right of the hole point. Select the most proper one of motion vectors of the nearest non-hole pixels for mapping the hole point. The method on how to select the most proper non-hole pixels and the most proper motion vectors is described in detail in the following sections.

For hole pixel P, it is necessary to analyze the nearest four pixels above, below, on the left or the right of the hole pixel, and it is of course possible for those skilled in the field to analyze eight pixels around the hole pixel P, or to analyze the pixels around the hole pixel P in a preset range or with a preset number of pixels. For convenient description, in the present example, the nearest four pixels above, below, on the left or the right of the hole pixel P are analyzed. If the four pixels are all hole pixels, continue to analyze the pixels within the preset range of the hole pixel P in a preset manner, until a proper non-hole pixel is found, or directly abandon processing of the hole pixel P.

It should be stated that, the t frame is a forward reference frame and the t+1 frame is a backward reference frame. After the processing from Step S1 to S7, an interpolated frame is inserted between the t frame and the t+1 frame, and the number of frames in the frame sequence is doubled as a whole. For proper description, take the i frame, the i−1 frame and the i+1 frame as examples, wherein the i frame is an interpolated frame.

For convenient description, it is assumed that the pixel above the hole pixel P in the i frame is a non-hole pixel and is mapped by the forward motion vector $V_{i-1}^f$ of a pixel in the i frame. The pixel below the hole pixel P is a non-hole pixel and is mapped by the backward motion vector $V_{i+1}^b$ of a pixel in the i+1 frame. The pixel on the left of the hole pixel P is a non-hole pixel and corresponds to the forward motion vector of a pixel in the i−1 frame and the backward motion vector of a pixel in the i+1 frame, that is, the pixel on the left of the hole pixel P is obtained by the interaction of the forward and backward motion vectors. The pixel on the right side of the hole pixel P is also a hole pixel, which is not considered. In this assumption, the nearest four pixels above, below, on the left or the right of the hole pixel P represent all possible cases.

In order to give the most proper motion vector to the hole pixel P, it is necessary to analyze the motion vector of the nearest non-hole pixels above, below, on the left or the right of the hole pixel P. As the non-hole pixel above the hole pixel P is mapped by the forward motion vector $V_{i-1}^f$ of a pixel in the i−1 frame, the gray scale difference $\Delta^f(x)$ of the forward motion vector $V_{i-1}^f$ of the pixel in the i−1 frame is determined by the formula (1.6) below:

$$\Delta^f(x) = \left| F_{i-1}\left(x - \frac{V_{i-1}^f}{2}\right) - F_{i+1}\left(x + \frac{V_{i-1}^f}{2}\right) \right|, \quad (1.6)$$

As the non-hole pixel below the hole pixel P is mapped by the backward motion vector $V_{i+1}^b$ of a pixel in the i+1 frame, the gray scale difference $\Delta^b(x)$ of the backward motion vector $V_{i+1}^b$ of the pixel in the i−1 frame is determined by the formula (1.7) below:

$$\Delta^b(x) = \left| F_{i-1}\left(x + \frac{V_{i+1}^b}{2}\right) - F_{i+1}\left(x - \frac{V_{i+1}^b}{2}\right) \right|, \quad (1.7)$$

wherein x is the coordinate of the hole pixel, $V_{i-1}^f$ is the forward motion vector $V_{i-1}^f$ of a pixel in the i frame corresponding to the pixel above the hole pixel P, $V_{i+1}^b$ is the backward motion vector of a pixel in the i+1 frame corresponding to the pixel below the hole pixel P.

As the non-hole pixel on the left of the hole pixel P is jointly mapped by the forward motion vector $V_{i-1}^f$ of a pixel in the i−1 frame and the backward motion vector $V_{i+1}^b$ of a pixel in the i+1 frame, the gray scale difference $\Delta^f(x)$ of the forward motion vector $V_{i-1}^f$ of the pixel in the i−1 frame and the gray scale difference $\Delta^b(x)$ of the backward motion vector $V_{i+1}^f$ of the pixel in the i−1 frame corresponding to the non-hole pixel are determined by the formulae (1.6) and (1.7).

The hole pixel on the right of the hole pixel P is not considered.

In this case, compare the four obtained values and select the minimum value among the gray scale difference of the forward motion vector of a pixel in the i−1 frame corresponding to the non-hole pixel above the hole pixel P, the gray scale difference of the backward motion vector of a pixel in the i+1 frame corresponding to the non-hole pixel below the hole pixel P, the gray scale difference of the forward motion vector of a pixel in the i−1 frame corresponding to the non-hole pixel on the left of the hole pixel P and the gray scale difference of the backward motion vector of a pixel in the i+1 frame corresponding to the non-hole pixel on the right the hole pixel P. The motion vector of the non-hole pixel with the minimum value is taken as the motion vector for mapping the hole pixel P.

For example, assume that the gray scale difference of the forward motion vector of a pixel in the i−1 frame corresponding to the non-hole pixel on the left of the hole pixel P is the minimum, then the forward motion vector of a pixel in the i−1 frame corresponding to the non-hole pixel on the left of the hole pixel P is taken as the motion vector for mapping the hole pixel P.

If the $\Delta(x)$ values of all motion vectors (all obtained $\Delta^f(x)$ and $\Delta^b(x)$) are greater than the threshold $\Delta$, then there is no proper motion vector for the hole pixel P and the hole pixel P is not processed. Otherwise, the motion vector with the minimum $\Delta(x)$ value is the most proper motion vector.

In the case that the most proper motion vector is a forward motion vector, the gray scale $F_i(x)$ of the hole pixel P is calculated in the following formula:

$$F_i(x) = \frac{1}{2}\left[F_{i-1}\left(x - \frac{V_{i-1}^f}{2}\right) + F_{i+1}\left(x + \frac{V_{i-1}^f}{2}\right)\right] \qquad (1.8)$$

In the case that the most proper motion vector is a backward motion vector, the gray scale $F_i(x)$ of the hole pixel P is calculated in the following formula:

$$F_i(x) = \frac{1}{2}\left[F_{i-1}\left(x - \frac{V_{i+1}^b}{2}\right) + F_{i+1}\left(x + \frac{V_{i+1}^b}{2}\right)\right] \qquad (1.9)$$

In this case, it is assumed that the forward motion vector of a pixel in the i−1 frame corresponding to the non-hole pixel on the left of the hole pixel P is the most proper motion vector, so the gray scale of hole pixel P is calculated by the formula (1.8).

For the remaining holes, the neighborhood four pixels above, below, on the left or the right of the hole pixel are used for linear interpolation to fill, and the linear interpolation algorithm adopts the prior art.

Step S9: down-sampling the interpolated frame after repairing the hole point, and obtaining a final interpolated frame.

Since the original frame is up-sampled in the above steps, causing doubled number of pixels, it is only necessary to remove the extra pixels via down-sampling to obtain the final interpolated frame.

Embodiment 2

Jagged problem and noise problem exist with the direct use of optical flow method. In Embodiment 1, the jagged problem is solved in Step S3, and the noise problem is solved in Step S4, which may be performed in succession or in parallel. Different from Embodiment 1, the noise problem is solved first and the jagged problem is solved later in the present example. The detailed steps are as follows:

A Process to Calculate Motion Vectors:

Step S1: with regard to a frame sequence of input video, estimating bidirectional motion vectors between two adjacent frames by using the optical flow method.

Determining whether the motion vector is reliable:

Step S2: determining whether the bidirectional motion vector is reliable.

Step S3: performing smoothing filtering based on image segmentation of the bidirectional motion vector between the two adjacent frames.

Step S4: spatial up-sampling each frame in the frame sequence.

Step S5: marking "shielding" and "exposure" regions in the two adjacent frames, and updating an unreliable motion vector.

Mapping the Interpolated Frame:

Step S6: with regard to the two adjacent frames, according to marking information about the "shielding" and "exposure" regions and a bidirectional motion vector field obtained after update processing, mapping the t frame and the t+1 frame to an interpolated frame to obtain a forward interpolated frame and a backward interpolated frame, respectively.

Step S7: synthesizing the forward interpolated frame of the t frame and the backward interpolated frame of the t+1 frame into an interpolated frame.

Repairing the Interpolated Frame:

Step S8: repairing a hole point in the interpolated frame by using the difference algorithm.

Step S9: down-sampling the interpolated frame after repairing the hole point, and obtaining a final interpolated frame.

Embodiment 3

In Embodiment 1, it is possible to solve the jaggedness problem and noise problem and mark the "shielding" and/or "exposure" region, that is, update the unreliable motion vector in parallel. The process in the present embodiment is as follows:

Step S1: with regard to a frame sequence of input video, estimating the bidirectional motion vector between two adjacent frames using the optical flow method.

Step S2: determining whether the bidirectional motion vector is reliable.

Step S3: marking "shielding" and "exposure" regions in the two adjacent frames, and updating an unreliable motion vector.

Step S4: performing smoothing filtering of the bidirectional motion vector between the two adjacent frames based on image segmentation.

Step S5: spatial up-sampling each frame in the frame sequence.

Step S6: with regard to the two adjacent frames, according to marking information about the "shielding" and "exposure" regions and a bidirectional motion vector field obtained after update processing, mapping the t frame and the t+1 frame to an interpolated frame to obtain a forward interpolated frame and a backward interpolated frame, respectively.

Step S7: synthesizing the forward interpolated frame of the t frame and the backward interpolated frame of the t+1 frame into the interpolated frame.

Step S8: repairing a hole point in the interpolated frame using the difference algorithm.

Step S9: down-sampling the interpolated frame after repairing the hole point, and obtaining a final interpolated frame.

Embodiment 4

In some processing environments, the jaggedness problem and/or the noise problem of the optical flow method may be ignored, so the process corresponding to Step S3 and/or Step S4 in Embodiment 1 may be not considered, as described in the following video interpolation processing.

Step S1: with regard to a frame sequence of input video, estimating the bidirectional motion vector between two adjacent frames by using the optical flow method.

Step S2: judging whether the bidirectional motion vector is reliable.

Step S3: marking "shielding" and "exposure" regions in the two adjacent frames, and updating an unreliable motion vector.

Step S4: with regard to the two adjacent frames, according to marking information about the "shielding" and "exposure" regions and a bidirectional motion vector field obtained after update processing, mapping the t frame and the t+1 frame to an interpolated frame to obtain a forward interpolated frame and a backward interpolated frame, respectively.

Step S5: synthesizing the forward interpolated frame of the t frame and the backward interpolated frame of the t+1 frame into the interpolated frame.

Step S6: repairing a hole point in the interpolated frame by using the difference algorithm, and obtaining a final interpolated frame.

Embodiment 5

Step S2 of determining whether the bidirectional motion vector is reliable in and Step S3 of spatial up-sampling each frame in the frame sequence in Embodiment 1 can be performed in parallel rather than sequential. The video frame interpolation system based on an optical flow method can include the following units:

A motion vector calculation unit estimates the motion vector between two adjacent frames by using the optical flow method with regard to a frame sequence of input video.

A motion vector reliability judging unit spatial up-samples each frame in the frame sequence, determines whether the bidirectional motion vector is reliable, and marks "shielding" and "exposure" regions in the two adjacent frames, and updating an unreliable motion vector.

An interpolated frame mapping unit is used to map the t frame and the t+1 frame to an interpolated frame to obtain a forward interpolated frame and a backward interpolated frame respectively, according to marking information about the "shielding" and "exposure" regions and a bidirectional motion vector field obtained after update processing, then synthesizes the forward interpolated frame of the t frame and the backward interpolated frame of the t+1 frame into the interpolated frame.

An interpolated frame repairing unit repairs a hole point in the interpolated frame by using the difference algorithm, and down-samples the interpolated frame after repairing the hole point, and obtaining a final interpolated frame.

Embodiment 6

A video frame interpolation method based on an optical flow method can include the following steps:

The motion vector calculation process: with regard to a frame sequence of input video, performing a calculation to obtain the motion vector between two adjacent frames by using the optical flow method, wherein the two adjacent frames include the forward reference frame and the backward reference frame; and The interpolated frame mapping process: mapping between the two adjacent frames according to the motion vector field between the two adjacent frames to obtain interpolated frames. This process can be implemented by any one of the prior arts.

The present invention has been described in detail with reference to the disclosed embodiments, which are merely for the purpose of understanding the present invention. The invention is not limited to the embodiments referred to, but may be varied and modified by those skilled in the field without departing from the idea of the present invention.

What is claimed is:

1. A video frame interpolation method based on an optical flow method, comprising:
   calculating motion vectors, comprising: receiving a frame sequence of input video; and using optical flow method to calculate motion vectors between two adjacent frames, wherein the two adjacent frames include a forward reference frame and a backward reference frame; and mapping an interpolated frame, comprising: mapping between the two adjacent frames to obtain an interpolated frame according to a motion vector field comprising the motion vectors between the two adjacent frames, wherein calculating motion vectors comprises:
   calculate bidirectional motion vectors between the two adjacent frames using the optical flow method,
   the video frame interpolation method further comprises:
   after calculating a motion vector, judging reliability of the bidirectional motion vectors between the two adjacent frames to produce a reliability judgment result;
   marking an occlusion region in the two adjacent frames according to the reliability judgment result; and
   updating an unreliable motion vector in the occlusion region,
   wherein mapping an interpolated frame comprises:
   according to marking information about the occlusion regions and a motion vector field obtained after update, mapping the forward reference frame to an interpolated frame to obtain a forward interpolated frame, mapping the backward reference frame to an interpolated frame to obtain a backward interpolated frame; and synthesizing the forward interpolated frame and the backward interpolated frame into the interpolated frame.

2. The video frame interpolation method of claim 1, further comprising:
   assigning a pixel in the forward interpolated frame as a current pixel;
   defining a forward motion vector of the current pixel as a motion vector of the current pixel from the backward reference frame to the forward reference frame; and
   defining a forward reference pixel as a pixel in the forward reference frame that the forward motion vector of the current pixel directed to;
   defining a backward motion vector of the forward reference pixel as a motion vector of the forward reference pixel from the forward reference frame to the backward reference frame,
   wherein judging reliability of the bidirectional motion vectors between the two adjacent frames to produce a reliability judgment result further comprises:
   calculating a gray scale difference between the current pixel in the backward reference frame and the forward reference pixel in the forward reference frame;
   if the gray scale difference is equal to or greater than a threshold of the gray scale difference, determining that the forward motion vector of the current pixel is unreliable;
   if the gray scale difference is less than a threshold of the gray scale difference, calculating a distance between the forward motion vector of the current pixel and the backward motion vector of the forward reference pixel;
   if the distance between the forward motion vector of the current pixel and the backward motion vector of the forward reference pixel is less than a threshold of motion vector distance, determining that the forward motion vector of the current pixel is reliable; and
   if the distance between the forward motion vector of the current pixel and the backward motion vector of the forward reference pixel is more than or equal to a threshold of motion vector distance, determining that the forward motion vector of the current pixel is unreliable.

3. The video frame interpolation method of claim 2, wherein the gray scale difference between the current pixel in the backward reference frame and the forward reference pixel in the forward reference frame is calculated as follows:

$$AD_t(x) = |F_t(x) - F_{t+1}(x + V_x)|,$$

wherein $AD_t(x)$ is the gray scale difference between the current pixel in the backward reference frame and the forward reference pixel in the forward reference frame, $F_t(x)$ is a gray scale of current pixel in the backward reference frame, $F_{t+1}(x+V_x)$ is a gray scale of forward reference pixel in forward reference frame, $V_x$ is the forward motion vector of current pixel from the backward reference frame to the forward reference frame, x is a position of current pixel in the backward reference frame, $x+V_x$ is a position of the forward reference pixel in the forward reference frame, and t is a sequence number of the backward reference frame, and t+1 is a sequence number of the forward reference frame,
wherein the distance between the forward motion vector of the current pixel and the backward motion vector of the forward reference pixel is calculated as follows:

$$MVD_t(x) = \|V_{t,x}^f - V_{t+1,x'}^b\|,$$

wherein $MVD_t(x)$ is the distance between the forward motion vector of the current pixel and the backward motion vector of the forward reference pixel, $V_{t,x}^f$ is the forward motion vector of the current pixel, $V_{t+1,x'}^b$ is the backward motion vector of the forward reference pixel, x is the position of current pixel in the backward reference frame, x' is a position of forward reference pixel in the forward reference frame, t is the sequence number of the backward reference frame, and t+1 is the sequence number of the forward reference frame, and $\|\cdot\|$ represents the Euclidean distance.

4. The video frame interpolation method of claim 1, wherein updating an unreliable motion vector in the occlusion region comprises:
replacing the unreliable motion vector of a pixel by an inverse value of a reliable motion vector in the bidirectional motion vector of the pixel.

5. The video frame interpolation method of claim 1, wherein mapping the forward reference frame to an interpolated frame to obtain a forward interpolated frame, and mapping the backward reference frame to an interpolated frame to obtain a backward interpolated frame comprise:
judging reliability of the motion vector of a pixel in the forward reference frame or the backward reference frame;
if the motion vector of the pixel is reliable, further judging whether the pixel has a "conflict";
if the motion vector of the pixel is unreliable, judging whether the pixel is in "shielding" and/or "exposure" region; if YES, further judging whether the pixel has a "conflict"; and if NO, discarding the pixel;
if the pixel has no "conflict", mapping the pixel; and
if the pixel has a "conflict", judging whether the motion vector of the pixel is more reliable than the pixel that has "conflict" and been mapped; if YES, mapping the pixel; and if NO, discarding the pixel.

6. The video frame interpolation method of claim 1, wherein judging reliability of the bidirectional motion vectors further comprises:
processing a jagged problem and/or a noise problem arisen in the optical flow method, comprising:
performing a smoothing filtering of the bidirectional motion vector between the two adjacent frames based on image segmentation.

7. The video frame interpolation method of claim 1, further comprising:
after mapping an interpolated frame, repairing the interpolated frame, comprising:
repairing a hole point in the interpolated frame to obtain the interpolated frame.

8. The video frame interpolation method of claim 7, wherein judging reliability of the bidirectional motion vectors further comprises:
performing a smoothing filtering of the bidirectional motion vector between the said two adjacent frames based on image segmentation;
spatial up-sampling the two adjacent frames;
or, performing a smoothing filtering of the bidirectional motion vector between the two adjacent frames based on image segmentation after spatial up-sampling;
or, performing a smoothing filtering of the bidirectional motion vector between the two adjacent frames; and spatial up-sampling the two adjacent frames based on image segmentation after smoothing filtering,
wherein repairing the interpolated frame comprises:
repairing a hole point in the interpolated frame; and
down-sampling the interpolated frame after repairing the hole to obtain the interpolated frame.

9. The video frame interpolation method of claim 8, wherein spatial up-sampling the two adjacent frames comprises:
multiplying number of pixels of each image in the two adjacent frames by a pre-set time; and
enlarging the value of the bidirectional motion vector by the pre-set time,
wherein down-sampling the interpolated frame comprises:
reducing number of pixels of each image in the interpolated frame by a pre-set time; and
reducing a value of the bidirectional motion vector by the pre-set time.

10. The video frame interpolation method of claim 7, wherein repairing a hole point in the interpolated frame, comprising:
analyzing motion vectors of non-hole pixels within a preset range adjacent to the hole pixel in the interpolated frame;
obtaining a most proper one of motion vectors of the non-hole pixels; and
mapping the motion vector of the hole pixel using the most proper motion vector so as to interpolate the hole region.

11. The video frame interpolation method of claim 10, wherein obtaining a most proper one of motion vectors of the non-hole pixels comprises:
if a non-hole pixel within the preset range adjacent to the hole point is simply mapped by a forward motion vector, calculating the gray scale difference corresponding to the forward motion vector according to the following formula:

$$\Delta^f(x) = \left| F_{i-1}\left(x - \frac{V_{i-1}^f}{2}\right) - F_{i+1}\left(x + \frac{V_{i-1}^f}{2}\right) \right|,$$

wherein $\Delta_f(x)$ is a formula for mapping the gray scale difference corresponding to the forward motion vector of a non-hole pixel, x is a position of the hole pixel, i−1 is a serial number of a previous frame of the frame in which the hole pixel is located, i+1 is a serial number of a next frame of the frame in which the pixel is located, $V_{i-1}^f$ is a forward motion vector for mapping this non-hole pixel;

if a non-hole pixel within the preset range adjacent to the hole point is simply mapped by a backward motion vector, calculating a gray scale difference corresponding to the backward motion vector according to the following formula:

$$\Delta^b(x) = \left| F_{i-1}\left(x + \frac{V_{i+1}^b}{2}\right) - F_{i+1}\left(x - \frac{V_{i+1}^b}{2}\right) \right|,$$

wherein $\Delta^b(x)$ is a formula for mapping the gray scale difference corresponding to the backward motion vector of a non-hole pixel, $V_{i+1}^b$ is a backward motion vector for mapping the non-hole pixel;

if a non-hole pixel within the preset range adjacent to the hole point is jointly mapped by both a forward motion vector and a backward motion vector, calculating a gray scale difference corresponding to the forward motion vector and the backward motion vector; and based on the gray scale difference obtained, selecting the motion vector with the minimum gray scale difference as the most proper one of motion vectors of the non-hole pixels.

12. The video frame interpolation method of claim 11, wherein obtaining a most proper one of motion vectors of the non-hole pixels comprises:

if the most proper one of motion vectors is a forward motion vector, the gray scale value of the hole pixel is calculated according to the following formula:

$$F_i(x) = \frac{1}{2}\left[ F_{i-1}\left(x - \frac{V_{i-1}^f}{2}\right) + F_{i+1}\left(x + \frac{V_{i-1}^f}{2}\right) \right],$$

wherein $F_i(x)$ is the gray scale of the hole pixel, $V_{i-1}^f$ is the forward motion vector for mapping the hole pixel;

if the most proper motion vector is a backward motion vector, the gray scale value of the hole pixel is calculated according to the following formula:

$$F_i(x) = \frac{1}{2}\left[ F_{i-1}\left(x - \frac{V_{i+1}^b}{2}\right) + F_{i+1}\left(x + \frac{V_{i+1}^b}{2}\right) \right],$$

wherein $V_{i+1}^b$ is the backward motion vector for mapping the hole pixel.

* * * * *